(12) United States Patent
Maor et al.

(10) Patent No.: US 11,639,992 B2
(45) Date of Patent: May 2, 2023

(54) APPARATUS, SYSTEM AND METHOD OF GENERATING RADAR INFORMATION BASED ON AN AMPLITUDE PHASE ESTIMATION CALCULATION

(71) Applicant: INTEL CORPORATION, Santa Clara, CA (US)

(72) Inventors: Lior Maor, Petach-Tikva (IL); Moshe Teplitsky, Tel-Aviv (IL); Alon Cohen, Modiin (IL); Ilia Yoffe, Ashdod (IL)

(73) Assignee: INTEL CORPORATION, Santa Clara, CA (US)

( * ) Notice: Subject to any disclaimer, the term of this patent is extended or adjusted under 35 U.S.C. 154(b) by 275 days.

(21) Appl. No.: 16/911,773

(22) Filed: Jun. 25, 2020

(65) Prior Publication Data
US 2020/0326423 A1    Oct. 15, 2020

(51) Int. Cl.
| G01S 13/931 | (2020.01) |
| G01S 7/03 | (2006.01) |
| G01S 13/42 | (2006.01) |
| G01S 19/29 | (2010.01) |
| G01S 19/44 | (2010.01) |

(52) U.S. Cl.
CPC ............ *G01S 13/931* (2013.01); *G01S 7/03* (2013.01); *G01S 13/42* (2013.01); *G01S 19/29* (2013.01); *G01S 19/44* (2013.01); *G01S 2013/9318* (2020.01); *G01S 2013/93185* (2020.01)

(58) Field of Classification Search
CPC .......... G01S 13/931; G01S 7/03; G01S 13/42; G01S 2013/93185; G01S 2013/9318; G01S 7/41; G01S 7/42
See application file for complete search history.

(56) References Cited

U.S. PATENT DOCUMENTS

| 9,869,762 B1* | 1/2018 | Alland | H01Q 21/08 |
| 2018/0128916 A1* | 5/2018 | Bialer | G01S 13/87 |
| 2019/0072668 A1* | 3/2019 | Duque Biarge | G01S 13/931 |
| 2020/0064455 A1* | 2/2020 | Schroder | G01S 13/878 |

FOREIGN PATENT DOCUMENTS

WO    2018/122849    7/2018

OTHER PUBLICATIONS

Luzhou Xu, J. Li and P. Stoica, "Adaptive Techniques for MIMO Radar," Fourth IEEE Workshop on Sensor Array and Multichannel Processing, 2006., 2006, pp. 258-262, doi: 10.1109/SAM.2006.1706133. (Year: 2006).*

(Continued)

*Primary Examiner* — Bernarr E Gregory
*Assistant Examiner* — Yonghong Li
(74) *Attorney, Agent, or Firm* — Shichrur & Co.

(57) ABSTRACT

For example, an apparatus may include a radar processor to process radar receive (Rx) data, the radar Rx data based on radar signals received via a plurality of Rx antennas of a Multiple-Input-Multiple-Output (MIMO) radar antenna; and to generate radar information by applying an Amplitude Phase Estimation (APES) calculation to the radar Rx data.

25 Claims, 9 Drawing Sheets

(56) References Cited

OTHER PUBLICATIONS

W. Roberts, P. Stoica, J. Li, T. Yardibi and F. A. Sadjadi, "Iterative Adaptive Approaches to MIMO Radar Imaging," in IEEE Journal of Selected Topics in Signal Processing, vol. 4, No. 1, pp. 5-20, Feb. 2010, doi: 10.1109/JSTSP.2009.2038964. (Year: 2010).*

Jakobsson, Andreas, and Petre Stoica. "Combining Capon and APES for estimation of spectral lines." Circuits, Systems and Signal Processing 19, No. 2 (2000): 159-169. (Year: 2000).*

Search Report for European Patent Application No. 20210001.2-1206, dated May 26, 2021, 11 pages.

Luzhou Xu et al., "Target Detection and Parameter Estimation for MIMO Radar Systems", IEEE Transactions on Aerospace and Electronic Systems, IEEE Service Center, Piscataway, NJ, US, vol. 44, No. 3, Jul. 1, 2008, pp. 927-939.

Wei Xia et al., "Multiple-target localization and estimation of MIMO radars using Capon and APES techniques", Radar Conference, 2008, RADAR '08, IEEE, Piscataway, NJ, USA, May 26, 2008, pp. 1-6.

Z. Gao, X. Peng, and Y. Peng, "Adaptive DOA Estimation in MIMO Radar based on Canonical Correlation Analysis Method," Journal of Computers, vol. 9, No. 9, Sep. 2014, 7 pages.

L. Xu, J. Li, and P. Stoica, "Adaptive techniques for MIMO radar," in Proceedings of IEEE Sensor Array and Multichannel Signal Processing Workshop, 2006, pp. 258-262, 5 pages.

S. Jardak, S. Ahmed, and M.-S. Alouini, "Low Complexity Moving Target Parameter Estimation for MIMO Radar Using 2D-FFT," IEEE Transactions on Signal Processing, vol. 65, No. 18, pp. 4745-4755, Sep. 2017, 11 pages.

\* cited by examiner

APPARATUS, SYSTEM AND METHOD OF GENERATING RADAR INFORMATION BASED ON AN AMPLITUDE PHASE ESTIMATION CALCULATION

TECHNICAL FIELD

Embodiments described herein generally relate to generating radar information based on an Amplitude Phase Estimation (APES) calculation.

BACKGROUND

Radar systems, e.g., for ranges up to several hundreds of meters, may require simultaneous communication of transmit (Tx) and receive (Rx) signals.

Multiple Input Multiple Output (MIMO) radar is a technology that allows reduction of a physical array aperture and a number of antenna elements by transmission of orthogonal signals from a Tx array with a plurality of elements, and processing received signals via an Rx array with a plurality of elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
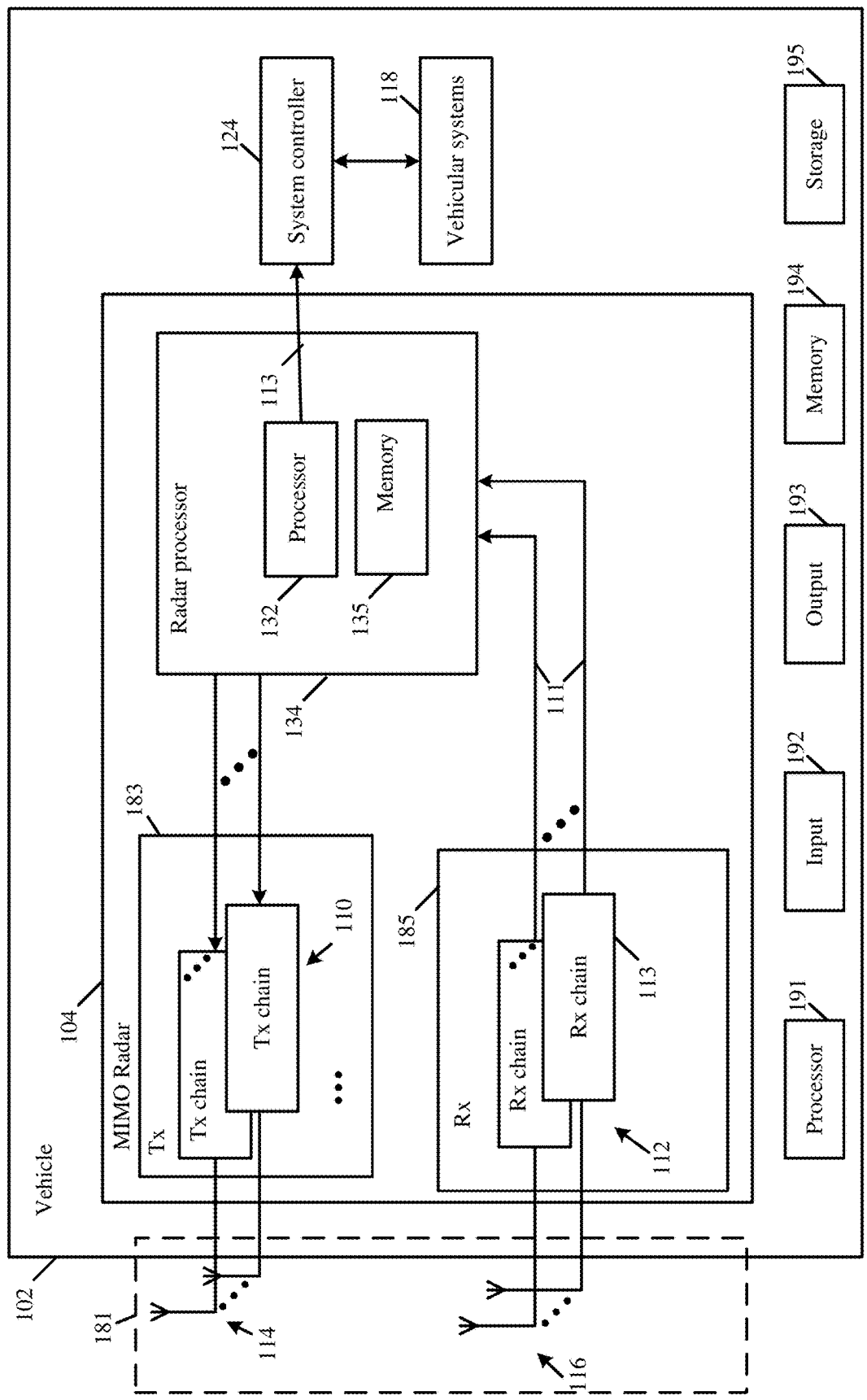
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some embodiments may be used in conjunction with Radio Frequency (RF) systems, radar systems, vehicular radar systems, detection systems, or the like.

The term "communicating" as used herein with respect to a communication signal includes transmitting the communication signal and/or receiving the communication signal. For example, a communication unit, which is capable of communicating a communication signal, may include a transmitter to transmit the communication signal, and/or a communication receiver to receive the communication signal. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with an RF frequency in a frequency band having a starting frequency above 10 Gigahertz (GHz), for example, a frequency band having a starting frequency between 10 Ghz and 120 GHz. For example, some demonstrative embodiments may be used in conjunction with an RF frequency having a starting frequency above 30 Ghz, for example, above 45 GHz, e.g., above 60 GHz. For example, some demonstrative embodiments may be used in conjunction with an automotive radar frequency band, e.g., a frequency band between 76 GHz and 81 GHz. However, other embodiments may be implemented utilizing any other suitable frequency bands, for example, a frequency band above 140 GHz, a frequency band of 300 GHz, a sub Terahertz (Thz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate and/or different transmit antenna elements and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to RF radar signals. However, other embodiments may be implemented with respect to any other wireless signals, wireless communication signals, communication scheme, network, standard and/or protocol.

Reference is now made to FIG. 1, which schematically illustrates a block diagram of a system including a vehicle 102, in accordance with some demonstrative embodiments.

In some demonstrative embodiments, vehicle 102 may include a car, a truck, a motorcycle, a bus, or any other vehicle.

In some demonstrative embodiments, vehicle 102 may be configured to support and/or implement a vehicular system, for example, to be implemented and/or to be mounted in vehicle 102.

In some demonstrative embodiments, the vehicular system may include, for example, an autonomous vehicle system, an automated driving system, a driver assistance and/or support system, and/or the like.

In some demonstrative embodiments, vehicle 102 may include a radar 104. For example, radar 104 may include a radar detecting device, a radar sensing device, a radar sensor, or the like, e.g., as described below.

In some demonstrative embodiments, vehicle 102 may include a single radar 104. In other embodiments, vehicle 102 may include a plurality of radars 104.

Some demonstrative embodiments are described herein with respect to a system including a vehicle, e.g., vehicle 102. Other embodiments may be implemented with respect to any other system, environment and/or apparatus 102, which may be implemented in any other object, environment, location, or place. For example, apparatus 102 may include a non-vehicular device, which may be implemented, for example, in an indoor location, a stationary infrastructure outdoors, or any other location.

In some demonstrative embodiments, radar 104 may include a Multiple Input Multiple Output (MIMO) radar 104, e.g., as described below. In one example, the MIMO radar may be configured to utilize "spatial filtering" processing, for example, beamforming and/or any other mechanism, for one or both of Transmit (Tx) signals and/or Receive (Rx) signals.

Some demonstrative embodiments are described below with respect to a radar 104 implemented as a MIMO radar. However, in other embodiments, radar 104 may be implemented as any other type of radar utilizing a plurality of antenna elements, e.g., a Single Input Multiple Output (SIMO) radar or a Multiple Input Single output (MISO) radar.

In some demonstrative embodiments, radar 104 may be configured to support autonomous vehicle usage, e.g., as described below.

In one example, radar 104 may determine a class, a location, an orientation, a velocity, an intention, a perceptional understanding of the environment, and/or any other information corresponding to an object in the environment.

In another example, radar 104 may be configured to determine one or more parameters and/or information for one or more operations and/or tasks, e.g., path planning, and/or any other tasks.

In other embodiments, radar 104 may be configured to support any other usages and/or applications.

In some demonstrative embodiments, radar 104 may be configured to detect, and/or sense, one or more objects, which are located in a vicinity, e.g., a far vicinity and/or a near vicinity, of the vehicle 102, and to provide one or more parameters, attributes, and/or information with respect to the objects.

In some demonstrative embodiments, radar 104 may be configured to detect the one or more objects in the vicinity of vehicle 102, for example, using RF and analog chains, capacitor structures, large spiral transformers, and/or any other electronic or electrical elements. In one example, radar 104 may be mounted onto, placed directly onto, or attached to, vehicle 102.

In some demonstrative embodiments, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative embodiments, the one or parameters, attributes and/or information with respect to an object may include a range of the object from the vehicle 102, an angle of the object with respect to the vehicle 102, a location of the object with respect to the vehicle 102, a relative speed of the object, and/or the like.

In some demonstrative embodiments, vehicle 102 may include a system controller 124 configured to control one or more functionalities, components, devices, systems and/or elements of vehicle 102.

In some demonstrative embodiments, system controller 124 may be configured to control one or more vehicular systems 118 of vehicle 102, e.g., as described below.

In some demonstrative embodiments, vehicular systems 118 may include, for example, a steering system, a braking system, a driving system, and/or any other system of the vehicle 102.

In some demonstrative embodiments, system controller 124 may configured to control radar 104, and/or to process one or parameters, attributes and/or information from radar 104.

In some demonstrative embodiments, system controller 124 may be configured, for example, to control the vehicular systems 118 of the vehicle 102, for example, based on radar information 113 from radar 104 and/or one or more other sensors of the vehicle, e.g., Light Detection and Ranging (LIDAR) sensors, camera sensors, and/or the like.

In one example, system controller 124 may control the steering system, the braking system, and/or any other vehicular systems 118 of vehicle 102, for example, based on the information from radar 104, e.g., based on one or more objects detected by radar 104.

In other embodiments, system controller 124 may be configured to control any other additional or alternative functionalities of vehicle 102.

In some demonstrative embodiments, vehicle 102 may include, for example, one or more of a processor 191, an input unit 192, an output unit 193, a memory unit 194, and/or a storage unit 195. Vehicle 102 may optionally include other suitable hardware components and/or software components. In some demonstrative embodiments, some or all of the components of one or more of vehicle 102 may be enclosed in a common housing or packaging, and may be interconnected or operably associated using one or more wired or wireless links. In other embodiments, components of one or more of vehicle 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS), e.g., a vehicular operating system, of vehicle 102 and/or of one or more suitable applications.

In some demonstrative embodiments, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a Solid State Drive (SSD), a floppy disk drive, a Compact Disk (CD) drive, a CD-ROM drive, a DVD drive, or other suitable removable or non-removable storage units. Memory unit 194 and/or storage unit 195, for example, may store data processed by vehicle 102.

In some demonstrative embodiments, radar 104 may include a radar processor 134 configured to process radar information of radar 104 and/or to control one or more operations of radar 104, e.g., as described below.

In some demonstrative embodiments, radar processor 134 may be configured to generate radar information 113, for example, based on radar signals communicated by radar 104, e.g., as described below.

In some demonstrative embodiments, radar processor 134 may include, or may be implemented, partially or entirely, by circuitry and/or logic, e.g., one or more processors including circuitry and/or logic, memory circuitry and/or logic. Additionally or alternatively, one or more functionalities of radar processor 134 may be implemented by logic, which may be executed by a machine and/or one or more processors, e.g., as described below.

In some demonstrative embodiments, radar processor 134 may include at least one processor 132 which may be configured, for example, to process radar information, and/or to perform one or more operations, methods, and/or algorithms.

In some demonstrative embodiments, radar processor 134 may include at least one memory 135, e.g., coupled to the processor 132, which may be configured, for example, to store, e.g., at least temporarily, at least some of the information processed by the processor 132, and/or which may be configured to store logic to be utilized by the processor 132.

In other embodiments, radar processor 134 may be implemented by one or more additional or alternative elements of vehicle 102.

In some demonstrative embodiments, at least part of the functionality of radar processor 134 may be implemented as part of system controller 124.

In other embodiments, the functionality of radar processor 134 may be implemented as part of any other element of radar 104 and/or vehicle 102.

In other embodiments, radar processor 134 may be implemented, as a separate part of, or as part of any other element of radar 104 and/or vehicle 102.

In some demonstrative embodiments, radar 104 may be implemented as a MIMO radar 104 utilizing a MIMO radar antenna 181 including a plurality of Tx antennas 114 configured to transmit a plurality of Tx RF signals (also referred to as "Tx radar signals"); and a plurality of Rx antennas 116 configured to receive a plurality of Rx RF signals (also referred to as "Rx radar signals"), for example, based on the Tx radar signals, e.g., as described below.

In some demonstrative embodiments, MIMO antenna array 181, antennas 114 and/or 116 may include or may be part of any type of antennas suitable for transmitting and/or receiving radar signals. For example, MIMO antenna array 181, antennas 114 and/or 116 may be implemented as part of any suitable configuration, structure, and/or arrangement of one or more antenna elements, components, units, assemblies, and/or arrays. For example, MIMO antenna array 181, antennas 114 and/or 116 may be implemented as part of a phased array antenna, a multiple element antenna, a set of switched beam antennas, and/or the like. In some embodiments, MIMO antenna array 181, antennas 114 and/or 116 may be implemented to support transmit and receive functionalities using separate and/or different transmit antenna elements and receive antenna elements. In some embodiments, MIMO antenna array 181, antennas 114 and/or 116 may be implemented to support transmit and receive functionalities using common and/or integrated transmit/receive elements.

In some demonstrative embodiments, MIMO radar 104 may include one or more radios configured to generate and transmit the Tx RF signals via Tx antennas 114; and/or to process the Rx RF signals received via Rx antennas 116, e.g., as described below.

In some demonstrative embodiments, radar 104 may include at least one transmitter (Tx) 183 including circuitry and/or logic configured to generate and/or transmit the Tx radar signals via Tx antennas 114.

In some demonstrative embodiments, radar 104 may include at least one receiver (Rx) 183 including circuitry and/or logic to receive and/or process the Rx radar signals received via Rx antennas 116, for example, based on the Tx radar signals.

In some demonstrative embodiments, transmitter 183, and/or receiver 185 may include circuitry; logic; RF elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, transmitter 183 may include a plurality of Tx chains 110 configured to generate and transmit the Tx RF signals via Tx antennas 114, e.g., respectively; and/or receiver 185 may include a plurality of Rx chains 112 configured to receive and process the Rx RF signals received via the Rx antennas 116, e.g., respectively.

In some demonstrative embodiments, radar processor 134 may be configured to generate the radar information 113, for example, based on the radar signals communicated by MIMO radar antenna 181, e.g., as described below.

In some demonstrative embodiments, radar processor 134 may be configured to generate the radar information 113 including one or more of range information, Doppler information, and/or Angle of Arrival (AoA) information, e.g., as described below.

In some demonstrative embodiments, radar processor 134 may be configured to generate the radar information 113 in the form of four Dimensional (4D) image information, e.g., a cube, which may represent 4D information corresponding to one or more detected targets.

In some demonstrative embodiments, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative embodiments, radar processor 134 may be configured to generate the radar information 113 in any other form, and/or including any other additional or alternative information.

In some demonstrative embodiments, MIMO radar 104 may be configured to utilize MIMO techniques, for example, to support a reduced physical array aperture, e.g., an array size, and/or utilize a reduced number of antenna elements. For example, MIMO radar 104 may be configured to transmit orthogonal signals via a Tx array including a plurality of N elements, e.g., Tx antennas 114, and processing received signals via an Rx array including a plurality of M elements, e.g., Rx antennas 116.

In some demonstrative embodiments, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, MIMO radar 104 may be configured to utilize MIMO antenna array 181 as a virtual array having an equivalent array size of N*M, which may define locations of virtual elements, for example, as a convolution of locations of physical elements, e.g., the antennas 114 and/or 116.

In some demonstrative embodiments, radar processor 134 may be configured to generate radar information 113, for example, based on radar Rx data 111. For example, radar processor 134 may include an input 109 to receive the radar Rx data 111, for example, from the Rx chains 113. For example, radar Rx data 111 may be based on radar signals received via Rx antennas 116.

In some demonstrative embodiments, radar processor 134 may be configured to generate radar information 113 including AoA information, for example, azimuth AoA information, elevation AoA information, and/or any other AoA-based information.

In some demonstrative embodiments, radar processor 134 may be configured to generate radar information 113 including an AoA spectrum, e.g., an azimuth AoA spectrum an elevation AoA spectrum, and/or any other AoA-based spectrum.

In one example, radar processor 134 may be configured to generate radar information 113 according to an algorithm for MIMO radar spatial signal processing and/or imaging, e.g., as described below.

In some demonstrative embodiments, radar processor 134 may be configured to generate the radar information 113 based on a super resolution algorithm, for example, an Amplitude Phase Estimation (APES) algorithm, e.g., as described below.

In some demonstrative embodiments, the APES algorithm may provide an increased resolution, which may improve estimation of targets, for example, in the far vicinity of vehicle 102.

In some demonstrative embodiments, the APES algorithm may be implemented to provide AOA estimation results with a reduced bias, for example, compared to other AoA estimation algorithms, e.g., a Capon AoA estimation algorithm. For example, the APES algorithm may provide the AoA estimation with a negligible degradation of a peak power, e.g., a negligible bias or substantially a null bias.

In some demonstrative embodiments, the APES algorithm may have a reduced computational complexity. For example, compared to other AoA estimation algorithms, e.g., a Least Square (LS) AoA estimation algorithm.

In some demonstrative embodiments, radar processor 134 may be configured to generate radar information 113 based on an APES calculation, which may be configured for a MIMO radar antenna distance greater than half of a wavelength of a central frequency of the radar signals, e.g., as described below.

In some demonstrative embodiments, the MIMO radar antenna distance may include a distance between first and second adjacent Rx antennas 116 of the MIMO radar antenna 181, and/or a distance between first and second adjacent Tx antennas 114 of the MIMO radar antenna 181, e.g., as described below.

In some demonstrative embodiments, radar processor 134 may receive via input 109 the radar Rx data 111 based on radar signals of MIMO radar antenna 181, e.g., radar signals received via the plurality of Rx antennas 116 of MIMO radar antenna 181.

In some demonstrative embodiments, processor 132 may generate the radar information 113, for example, by applying an APES calculation to the radar Rx data 111, e.g., as described below.

In some demonstrative embodiments, the APES calculation may be configured for a MIMO radar antenna distance greater than half of a wavelength of a central frequency of the radar signals communicated by radar 104, e.g., as described below.

In some demonstrative embodiments, the APES calculation may be configured such that the radar information 113 may include an AoA spectrum having, for a radar object, a single amplitude peak, e.g., which is above −40 Decibel (dB), corresponding to the radar object, e.g., as described below.

In some demonstrative embodiments, the single amplitude peak may have an amplitude greater than −30 dB, e.g., as described below.

In some demonstrative embodiments, the single amplitude peak may have an amplitude greater than −20 dB, e.g., as described below.

In some demonstrative embodiments, the single amplitude peak may have an amplitude greater than −10 dB, e.g., as described below.

In some demonstrative embodiments, the single amplitude peak may have an amplitude greater than −1 dB, e.g., as described below.

In other embodiments, the single amplitude peak may have any other amplitude, which may allow, for example, to distinguish and/or identify the amplitude peak, e.g., from one or more spurs and/or lobes in the AoA spectrum.

In some demonstrative embodiments, processor 132 may be configured to generate the radar information 113 including the AoA spectrum corresponding to the plurality of radar objects, e.g., as described below.

In some demonstrative embodiments, processor 132 may be configured to generate the radar information 113 such that the AoA spectrum may have a single amplitude peak, which is above −40 dB, for example, for each radar object of the plurality of radar objects, e.g., as described below.

In some demonstrative embodiments, processor 132 may be configured to generate the radar information 113, for example, including the AoA spectrum having an amplitude bias of no more than 1 dB, e.g., as described below.

In other embodiments, processor 132 may be configured to generate the radar information 113, for example, including the AoA spectrum having any other amplitude bias level.

In some demonstrative embodiments, processor 132 may be configured to implement an APES calculation, which may be configured to improve an APES accuracy, for example, at least with respect to a non-uniform antenna array, e.g., as described below.

In some demonstrative embodiments, there may be a need for a technical solution to support implementation of the APES algorithm in one or more use cases and/or scenarios, e.g., in addition to, or instead of an implementation of a uniform array with an antenna spacing equal to half of a wavelength, denoted λ, of a central frequency of the radar signal.

For example, there may be a need for a technical solution to support implementation of the APES algorithm, for example, while not limiting the APES algorithm to a uniform MIMO array with the antenna distances $d_{TX}=\lambda/2$ and $d_{RX}=\lambda/2$, wherein $d_{RX}$ denotes a MIMO Rx radar antenna distance between each first and second adjacent Rx antennas of the MIMO array, and $d_{TX}$ denotes a MIMO Tx radar antenna distance between each first and second adjacent Tx antennas of the MIMO array.

In some demonstrative embodiments, limiting the antenna distances to $d_{TX}=\lambda/2$ and $d_{RX}=\lambda/2$ may not enable to exploit one or more advantageous of a MIMO radar antenna. For example, this limitation may not enable to increase a resolution of a MIMO antenna without adding additional antenna elements to the MIMO antenna.

In some demonstrative embodiments, applying an APES algorithm, which is configured for the uniform array with antenna distances to $d_{TX}=\lambda/2$ and $d_{RX}=\lambda/2$, to a non-uniform antenna array, may result in a technical problem of an increased number of spatial spectrum spurs, e.g., which may have an amplitude greater than −20 dB. For example, these spectrum spurs may "contaminate" the AoA spectrum, and, accordingly, may reduce an accuracy of the AoA spectrum estimation based on the APES algorithm.

In some demonstrative embodiments, the spatial spectrum spurs may exist in an implementation of a MIMO antenna, having MIMO radar antenna distances $d_{TX}>\lambda/2$ and/or $d_{RX}>\lambda/2$, for example, even in case if a virtual array spacing, denoted $d_{Virt}$, is maintained to be equal to half of the wavelength of the central frequency, e.g., $d_{Virt}=\lambda/2$.

In some demonstrative embodiments, processor 132 may be configured to implement an APES calculation, which may be configured to support antenna distances greater than λ/2, e.g., as described below.

In one example, processor 132 may be configured to implement an APES calculation, which may be configured to support a MIMO Rx radar antenna distance, which may be greater than half of the wavelength λ of the central frequency of the radar signal, e.g., $d_{RX}>\lambda/2$, for example, while the MIMO Tx antenna distance may be $d_{TX}=\lambda/2$.

In another example, processor 132 may be configured to implement an APES calculation, which may be configured to support a MIMO Tx radar antenna distance, which may be greater than half of the wavelength λ of the central frequency of the radar signal, e.g., $d_{TX}>\lambda/2$, for example, while the MIMO Rx antenna distance may be $d_{RX}=\lambda/2$.

In another example, processor 132 may be configured to implement an APES calculation, which may be configured to support a MIMO Rx radar antenna distance, which may be greater than half of the wavelength λ of the central frequency of the radar signal, e.g., $d_{RX}>\lambda/2$, as well as a MIMO Tx radar antenna distance, which may be greater than half of the wavelength λ of the central frequency of the radar signal, e.g., $d_{TX}>\lambda/2$.

Figure 2:
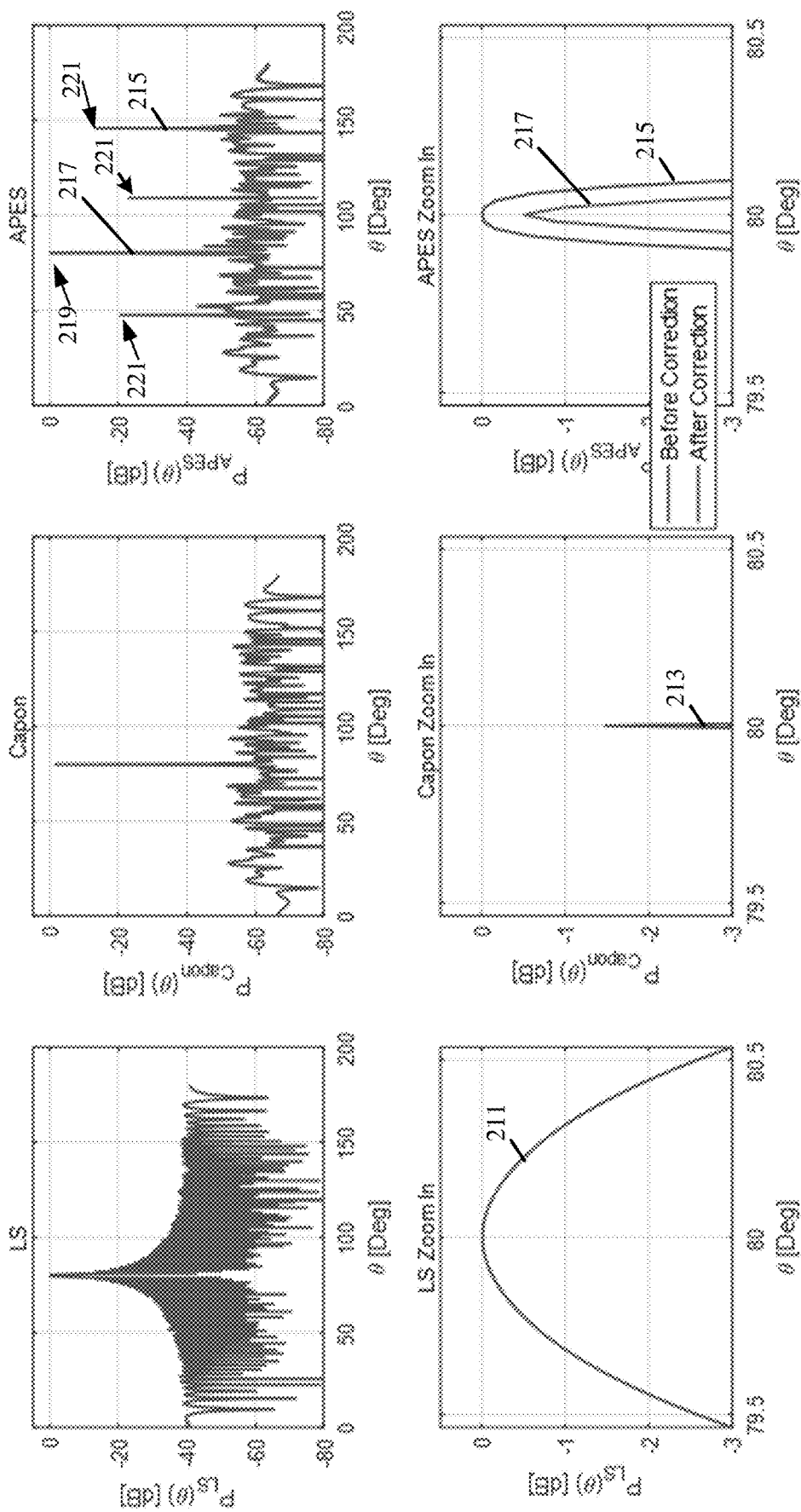
FIG. 2 is a schematic illustration of graphs depicting a comparison between a plurality of Angle of Arrival (AoA) spectrum estimations for a single target, in accordance with some demonstrative embodiments.

Reference is made to FIG. 2, which schematically illustrates graphs depicting a comparison between a plurality of AoA spectrum estimations for a single target, in accordance with some demonstrative embodiments.

In one example, the AoA spectrum estimations of FIG. 2 depict performance of a plurality of estimation algorithms in a scenario having one target, e.g., at an angle of 80 degrees. For example, the AoA spectrum estimations of FIG. 2 depict performance of the plurality of estimation algorithms using a MIMO antenna having 6 Tx antennas at a MIMO Tx radar antenna distance $d_{TX}=4*\lambda/2$, 16 Rx antennas at a MIMO Rx radar antenna distance $d_{RX}=\lambda/2$, with an SNR ratio of 0.1, and a number of measurements L=100.

As shown in FIG. 2, a curve 211 may represent AoA estimation results based on a Least Square (LS) algorithm.

As shown in FIG. 2, a curve 213 may represent AoA estimation results based on a Capon algorithm.

As shown in FIG. 2, a curve 215 may represent AoA estimation results based on an APES algorithm, which may be configured for a uniform array with antenna distances to $d_{TX}=\lambda/2$ and $d_{RX}=\lambda/2$.

As shown in FIG. 2, a curve 217 may represent AoA estimation results based on an APES calculation, which may be configured to support antenna distances of $d_{TX}>\lambda/2$ and/or $d_{RX}>\lambda/2$, in accordance with some demonstrative embodiments, e.g., as described below.

As shown in FIG. 2, the curves 215 and 217 may have an unbiased estimation of a target. For example, a degradation of the peak power of curves 215 and 217 at the angle of the target may be almost equal to zero, for example, compared to curve 213, which is based on the Capon algorithm, and may have a bias greater than 1 dB.

As shown in FIG. 2, a degradation of the peak power of curve 217 may be negligible, e.g., a bias lower than 0.4 dB, which may be significantly lower than the bias of the Capon algorithm.

In some demonstrative embodiments, as shown in FIG. 2, curve 217 may have a single amplitude peak 219, which is above −40 Decibel (dB), corresponding to the radar object at the angle of 80 degrees.

In some demonstrative embodiments, as shown in FIG. 2, in opposed to curve 217, the curve 215 may have a plurality of additional peaks 221, e.g., two additional peaks, which may have an amplitude above −40 dB, at angels, which may not correspond to the target.

Figure 3:
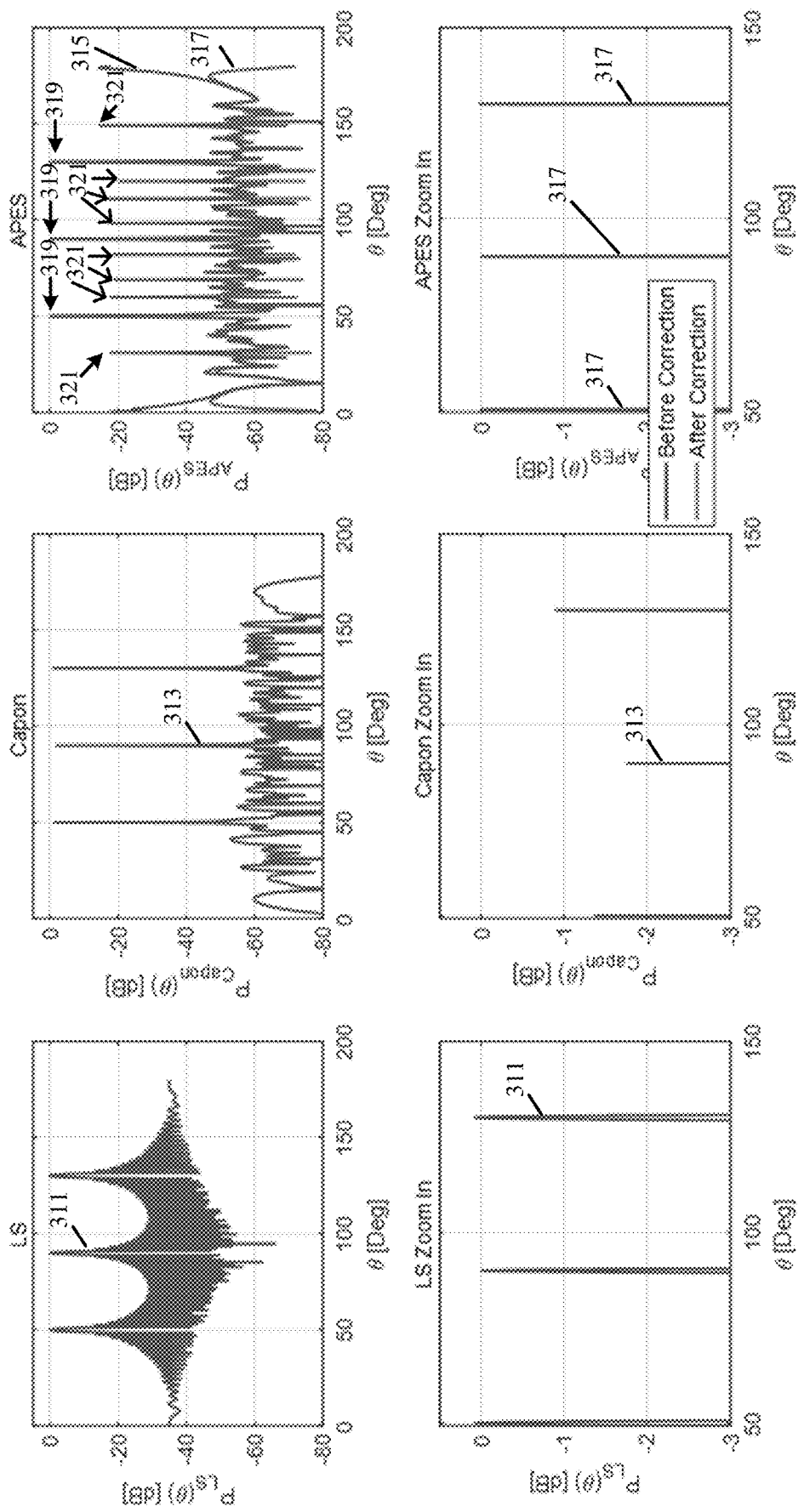
FIG. 3 is a schematic illustration of graphs depicting a comparison between the AoA spectrum estimations for multiple targets, in accordance with some demonstrative embodiments.

Reference is made to FIG. 3, which schematically illustrates graphs depicting a comparison between a plurality of AoA spectrum estimations for multiple targets, in accordance with some demonstrative embodiments.

In one example, the AoA spectrum estimations of FIG. 3 depict performance of a plurality of estimation algorithms in a scenario having three targets, e.g., at angles of about 50, 90 and 130 degrees, respectively. For example, the AoA spectrum estimations of FIG. 3 depict performance of the plurality of estimation algorithms using a MIMO antenna having 6 Tx antennas at a MIMO Tx radar antenna distance $d_{TX}=4*\lambda/2$, 16 Rx antennas at a MIMO Rx radar antenna distance $d_{RX}=\lambda/2$, with an SNR ratio of 0.1, and a number of measurements L=100.

As shown in FIG. 3, a curve 311 may represent AoA estimation results based on a Least Square (LS) algorithm.

As shown in FIG. 3, a curve 313 may represent AoA estimation results based on a Capon algorithm.

As shown in FIG. 3, a curve 315 may represent AoA estimation results based on an APES algorithm, which may be configured for a uniform array with antenna distances to $d_{TX}=\lambda/2$ and $d_{RX}=\lambda/2$.

As shown in FIG. 3, a curve 317 may represent AoA estimation results based on an APES calculation, which may be configured to support antenna distances of $d_{TX}>\lambda/2$ and/or $d_{RX}>\lambda/2$, in accordance with some demonstrative embodiments, e.g., as described below.

In some demonstrative embodiments, as shown in FIG. 3, curve 317 may have three amplitude peaks 319, which are above −40 Decibel (dB), corresponding to the three targets at the angles of about 50, 90 and 130 degrees, respectively.

In some demonstrative embodiments, as shown in FIG. 3, in opposed to curve 317, the curve 315 may have a plurality of additional peaks 321, which may have an amplitude above −40 dB, at angels, which may not correspond to any of the targets, and accordingly, may contaminate the AoA spectrum estimate and degrade the accuracy of the AoA estimation.

Referring back to FIG. 1, in some demonstrative embodiments, processor 132 may be configured to implement an APES calculation, which may include estimation of an amplitude value of the AoA spectrum, for example, based on a quotient of a first estimated value divided by a second estimated value, e.g., as described below.

In some demonstrative embodiments, the first estimated value may be based on a first steering vector of the MIMO radar antenna 181, e.g., as described below.

In some demonstrative embodiments, the first steering vector may include an Rx steering vector of the MIMO radar antenna 181, e.g., as described below.

In some demonstrative embodiments, the second estimated value may be based on a predefined constant factor, the first steering vector, and a second steering vector of the MIMO radar antenna 181, e.g., as described below.

In some demonstrative embodiments, the predefined constant factor may be based on a count of Tx antennas 114 in the MIMO radar antenna 181, e.g., as described below.

In some demonstrative embodiments, the second steering vector may include a Tx steering vector of the MIMO radar antenna 181, e.g., as described below.

In some demonstrative embodiments, the second estimated value may be based on a sum of a first calculation element and a second calculation element, e.g., as described below.

In some demonstrative embodiments, the second calculation element may include a product of a third calculation element and a fourth calculation element, e.g., as described below.

In some demonstrative embodiments, the first and third calculation elements may be based on the first steering vector, e.g., as described below.

In some demonstrative embodiments, the fourth calculation element may be based on the predefined constant factor and the second steering vector, e.g., as described below.

In some demonstrative embodiments, the fourth calculation element may include a sum of the predefined constant factor and a fifth calculation element, which may be based, for example, on the second steering vector, e.g., as described below.

In some demonstrative embodiments, processor 132 may be configured to implement an APES calculation, which may be configured to eliminate spurs, e.g., at least some or even all of the peaks 221 (FIG. 2) and/or peaks 321 (FIG. 3), that may appear in the AoA spectrum calculated based on the APES algorithm, for example, when implemented for a MIMO radar antenna distance greater than half of the wavelength of the central frequency of the radar signals, e.g., as described below.

In some demonstrative embodiments, based on analysis of the APES algorithm, e.g., as described below, it may be shown that at least some of the spurs may result from grating lobes in an array response of the RX and/or Tx antennas of the MIMO antenna array. For example, in some cases it may be shown that the location of the spurs may depend on a location of the targets and/or the array spacing, e.g., as described below.

In some demonstrative embodiments, an APES formula may be defined, configured, modified and/or enhanced, for example, to eliminate spurs, e.g., some or even all of the spurs, in an AoA spectrum estimation, e.g., as described below.

In one example, processor 132 may be configured to implement an APES calculation configured to support a first implementation of a MIMO antenna having a MIMO Tx radar antenna distance, which is greater than half of the wavelength of the central frequency of the radar signals e.g., $d_{TX} > \lambda/2$. In one example, according to this first implementation, the MIMO antenna may have a MIMO Rx radar antenna distance, which is equal to or less than half of the wavelength of the central frequency of the radar signals e.g., $d_{RX} = \lambda/2$. For example, according to this first implementation, the MIMO antenna array may be configured according to a virtual array spacing, which is equal to half of the wavelength of the central frequency of the radar signals, e.g., $d_{Virt} = \lambda/2$.

In another example, processor 132 may be configured to implement an APES calculation configured to support a second implementation of a MIMO antenna having a MIMO Rx radar antenna distance, which is greater than half of the wavelength of the central frequency of the radar signals e.g., $d_{RX} > \lambda/2$. In one example, according to this first implementation, the MIMO antenna may have a MIMO Tx radar antenna distance, which is equal to or less than half of the wavelength of the central frequency of the radar signals e.g., $d_{TX} = \lambda/2$. For example, according to this first implementation, the MIMO antenna array may be configured according to a virtual array spacing, which is equal to half of the wavelength of the central frequency of the radar signals, e.g., $d_{Virt} = \lambda/2$.

In other embodiments, processor 132 may be configured to implement an APES calculation configured to support any other implementation of the MIMO antenna array, e.g., having any other MIMO Tx radar antenna distance, MIMO Rx radar antenna distance, and/or virtual array spacing.

In some demonstrative embodiments, the radar signals communicated by MIMO array 181 may be represented according to a signal model of a radar system utilizing N Tx antennas and M Rx antennas, e.g., as follows:

$$X = a_r(\theta)\beta(\theta)a_t^T(\theta)S + W \quad (1)$$

wherein S denotes transmitted orthogonal signals, for example, the signals transmitted by Tx antennas 114, e.g., $S \in N \times L$; $a_t(\theta)$ denotes a Tx steering vector corresponding to the N Tx antennas, e.g., $a_t(\theta) \in N \times 1$; $\beta(\theta)$ denotes a complex amplitude, e.g., $\beta(\theta) \in 1 \times 1$, for example, due to a target RCS, range and/or angle; $a_r(\theta)$ denotes an Rx steering vector corresponding to the M receive antennas, e.g., $a_r(\theta) \in M \times 1$; W denotes an Additive white Gaussian Noise (AWGN) affecting the transmission from the N Tx antennas to the M Rx antennas, e.g., $W \in M \times L : W_{ij} : CN(0, \sigma_w^2)$; and X denotes observed measurements, for example, received signals, for example, the received signals at Rx antennas 116, e.g., $X \in M \times L$;

In some demonstrative embodiments, estimates of the amplitude values $\{\beta(\theta)\}$ may be used to form a spatial spectrum, for example, for a one-dimensional (1D) case, or for a radar image, for example, for a two-dimensional (2D) case.

In some demonstrative embodiments, an AoA spectrum may be estimated based on the signal model of Equation 1.

In one example, an LS algorithm may be implemented to estimate the amplitude values $\{\beta(\theta)\}$, e.g., as follows:

$$\hat{\beta}_{LS}(\theta) = \frac{a_r^H(\theta)XS^H a_t^*(\theta)}{\left(a_r^H(\theta)a_r(\theta)\right)\left(a_t^T(\theta)SS^H a_t^*(\theta)\right)} = \frac{a_r^H(\theta)XS^H a_t^*(\theta)}{L\left(a_r^H(\theta)a_r(\theta)\right)\left(a_t^T(\theta)\hat{R}_{SS}a_t^*(\theta)\right)} = \frac{a_r^H(\theta)XS^H a_t^*(\theta)}{LMN} \quad (2)$$

In another example, a Capon algorithm may be implemented to estimate the amplitude values $\{\beta(\theta)\}$, e.g., as follows:

$$\hat{\beta}_{Capon}(\theta) = \frac{a_r^H(\theta)\hat{R}^{-1}XS^H a_t^*(\theta)}{L\left(a_r^H(\theta)\hat{R}^{-1}a_r(\theta)\right)\left(a_t^T(\theta)\hat{R}_{SS}a_t^*(\theta)\right)} \quad (3)$$

In another example, an APES algorithm may be implemented to estimate the amplitude values $\{\beta(\theta)\}$, e.g., as follows:

$$\hat{\beta}_{APES}(\theta) = \frac{a_r^H(\theta)\hat{F}^{-1}XS^H a_t^*(\theta)}{L\left(a_r^H(\theta)\hat{F}^{-1}a_r(\theta)\right)\left(a_t^T(\theta)\hat{R}_{SS}a_t^*(\theta)\right)} \quad (4)$$

wherein:

$$\hat{R}_{SS} = \frac{1}{L}SS^H \to I_{N \times N}$$

$$\hat{R} = \frac{1}{L}XX^H$$

$$\hat{F} = \hat{R} - \frac{XS^H a_t^*(\theta)a_t^T(\theta)SX^H}{L^2\left(a_t^T(\theta)\hat{R}_{SS}a_t^*(\theta)\right)}$$

$$Y = \frac{1}{L}XS^H \text{ (output of the correlator)}$$

In some demonstrative embodiments, the estimation of the amplitude values $\{\beta(\theta)\}$ according to APES algorithm may be re-defined, for example, by rewriting Equation 4, e.g., as follows:

$$\hat{\beta}_{APES}(\theta) = \frac{a_r^H(\theta)\hat{F}^{-1}XS^H a_t^*(\theta)}{L\left(a_r^H(\theta)\hat{F}^{-1}a_r(\theta)\right)\left(a_t^T(\theta)\hat{R}_{SS}a_t^*(\theta)\right)} = \frac{a_r^H(\theta)\hat{F}^{-1}Ya_t^*(\theta)}{\left(a_r^H(\theta)\hat{F}^{-1}a_r(\theta)\right)\left(a_t^T(\theta)\hat{R}_{SS}a_t^*(\theta)\right)} \quad (5)$$

wherein:

$$p(\theta) = \left(a_t^T(\theta)\hat{R}_{SS}a_t^*(\theta)\right)$$

$$v = Ya_t^*$$

$$\hat{F} = \hat{R} - \frac{\frac{XS^H a_t^*(\theta)}{L^2}a_t^T(\theta)SX^H}{\left(\frac{a_t^T(\theta)}{\hat{R}_{SS}a_t^*(\theta)}\right)} = \hat{R} - \frac{Ya_t^* a_t^T Y^H}{a_t^T \hat{R}_{SS}a_t^*} = \hat{R} - \frac{Ya_t^* a_t^T Y^H}{p} = \hat{R} - \frac{vv^H}{p}$$

In some demonstrative embodiments, Equation 5 may be further developed, for example, by defining $\hat{F}^{-1}$ based on the Sherman-Morison formula $$(A + vv^H)^{-1} = A^{-1} - \frac{A^{-1}vv^H A^{-1}}{1 + v^H A^{-1} v},$$

as follows:

$$\hat{F}^{-1} = \hat{R}^{-1} + \frac{\hat{R}^{-1} vv^H \hat{R}^{-1}}{p - v^H \hat{R}^{-1} v} \quad (6)$$

In some demonstrative embodiments, Equation 5 may be rewritten based on Equation 6, e.g., as follows:

$$\hat{\beta}_{APES}(\theta) = \frac{a_r^H \hat{F}^{-1} v}{(a_r^H \hat{F}^{-1} a_r) p} = \quad (7)$$

$$\frac{a_r^H \left( \hat{R}^{-1} + \frac{\hat{R}^{-1} vv^H \hat{R}^{-1}}{p - v^H \hat{R}^{-1} v} \right) v}{a_r^H \left( \hat{R}^{-1} + \frac{\hat{R}^{-1} vv^H \hat{R}^{-1}}{p - v^H \hat{R}^{-1} v} \right) a_r \, p} = \frac{a_r^H \hat{R}^{-1} v + \frac{a_r^H \hat{R}^{-1} vv^H \hat{R}^{-1} v}{p - v^H \hat{R}^{-1} v}}{p a_r^H \hat{R}^{-1} a_r + \frac{p a_r^H \hat{R}^{-1} vv^H \hat{R}^{-1} a_r}{p - v^H \hat{R}^{-1} v}} =$$

$$\frac{p a_r^H \hat{R}^{-1} v - a_r^H \hat{R}^{-1} vv^H \hat{R}^{-1} v + a_r^H \hat{R}^{-1} vv^H \hat{R}^{-1} v}{p^2 a_r^H \hat{R}^{-1} a_r - p a_r^H \hat{R}^{-1} a_r v^H \hat{R}^{-1} v + p a_r^H \hat{R}^{-1} vv^H \hat{R}^{-1} a_r} =$$

$$\frac{a_r^H \hat{R}^{-1} v}{p a_r^H \hat{R}^{-1} a_r - a_r^H \hat{R}^{-1} a_r v^H \hat{R}^{-1} v + a_r^H \hat{R}^{-1} vv^H \hat{R}^{-1} a_r} =$$

$$\frac{a_r^H \hat{R}^{-1} v}{|a_r^H \hat{R}^{-1} v|^2 + a_r^H \hat{R}^{-1} a_r (p - v^H \hat{R}^{-1} v)}$$

In some demonstrative embodiments, Equation 7 may be rearranged, e.g., as follows:

$$\hat{\beta}_{APES}(\theta) = \frac{a_r^H(\theta) \hat{R}^{-1} v(\theta)}{|a_r^H(\theta) \hat{R}^{-1} v(\theta)|^2 + a_r^H(\theta) \hat{R}^{-1} a_r(\theta) (p(\theta) - v^H(\theta) \hat{R}^{-1} v(\theta))} \quad (8)$$

In some demonstrative embodiments, the format of Equation 8 may allow an efficient evaluation of the amplitude values {β(θ)}, for example, even without usage of an inverting matrix for each angle hypothesis. For example, Equation 8 may support an implementation in which the $\hat{R}^{-1}$ matrix may be inverted, e.g., only once.

In some demonstrative embodiments, components and/or terms of Equation 8 may be analyzed, for example, to determine a cause of spurs in an AoA spectrum, which may be determined based on Equation 8, e.g., based on the APES algorithm.

In some demonstrative embodiments, the cause of spurs in the AoA spectrum, e.g., as discussed above with reference to FIG. 2 and/or FIG. 3, may be determined based on analysis of components of Equation 8 in two scenarios, e.g., as described below. For example, a first scenario may include an implementation of a uniform array with antenna distances $d_{TX}=\lambda/2$ and $d_{RX}=\lambda/2$. For example, a second scenario may include an implementation of a uniform array with antenna distances to $d_{TX}>\lambda/2$ and/or $d_{RX}>\lambda/2$.

Figure 4:
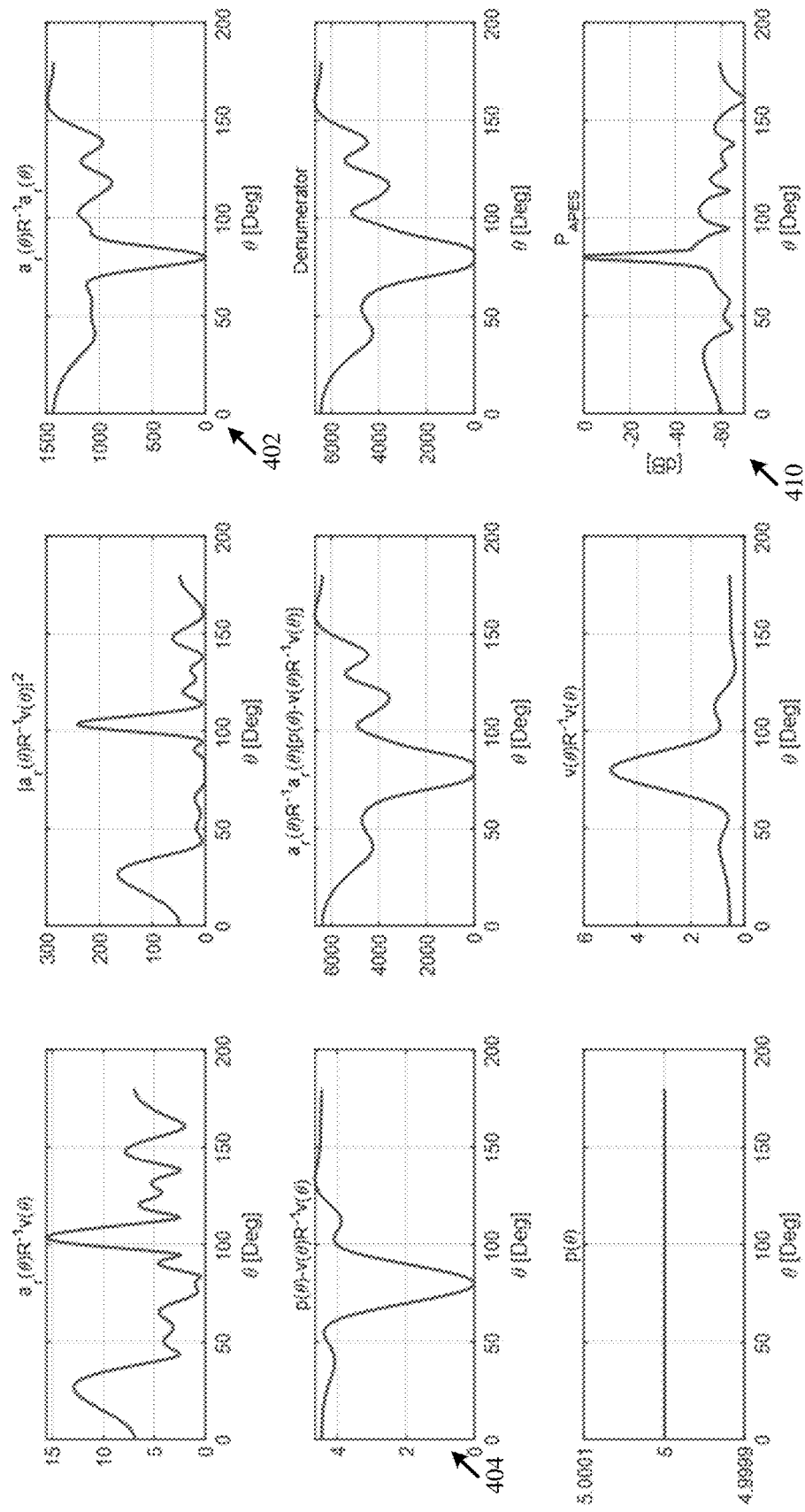
FIG. 4 is a schematic illustration of graphs depicting spectrums of components of an Amplitude Phase Estimation (APES) Equation for a first measurement simulation, to demonstrate a technical problem, which may be addressed in accordance with some demonstrative embodiments.

Reference is made to FIG. 4, which schematically illustrates graphs depicting spectrums of components of an APES Equation for a first measurement simulation, to demonstrate a technical problem, which may be addressed in accordance with some demonstrative embodiments. For example, the graphs of FIG. 4 may depict simulation results for components of the APES Equation according to Equation 8, for example, with respect to the first scenario of a uniform array with antenna distances $d_{TX}=\lambda/2$ and $d_{RX}=\lambda/2$.

In one example, the graphs of FIG. 4 depict the simulation results for components of the APES Equation, e.g., Equation 8, in a uniform array scenario having a single target, e.g., at an angle of about 80 degrees, using a MIMO antenna having 5 Tx antennas at a MIMO Tx radar antenna distance $d_{TX}=\lambda/2$, 10 Rx antennas at a MIMO Rx radar antenna distance $d_{RX}=\lambda/2$, and a virtual array spacing $d_{Virt}=\lambda/2$.

As shown in FIG. 4, a graph 402 represents simulated results of a first term, e.g., the term $a_r^H(\theta)\hat{R}^{-1}a_r(\theta)$, of the denominator of Equation 8.

As shown in FIG. 4, the graph 402 reaches a single low value, e.g., a value of almost zero, at the angle of about 80 degrees, e.g., corresponding to the target.

As shown in FIG. 4, a graph 404 represents simulation results of a second term, e.g., the term $p(\theta)-v(\theta)R^{-1}v(\theta)$ of the denominator of Equation 8.

As shown in FIG. 4, the graph 404 reaches a single low value, e.g., a value of almost zero, at the angle of about 80 degrees, e.g., corresponding to the target.

As shown in FIG. 4, a graph 410 represents simulation results of the APES AoA spectrum estimation, e.g., the value of $\hat{\beta}_{APES}(\theta)$ according to Equation 8.

As shown in FIG. 4, a graph 410 provides results similar to graphs 402 and 404, e.g., a single peak closes to zero at the angle of about 80 degrees. Therefore, the AoA spectrum estimation, e.g., according to the APES algorithm, may provide a relatively accurate imagining for the uniform array scenario.

Figure 5:
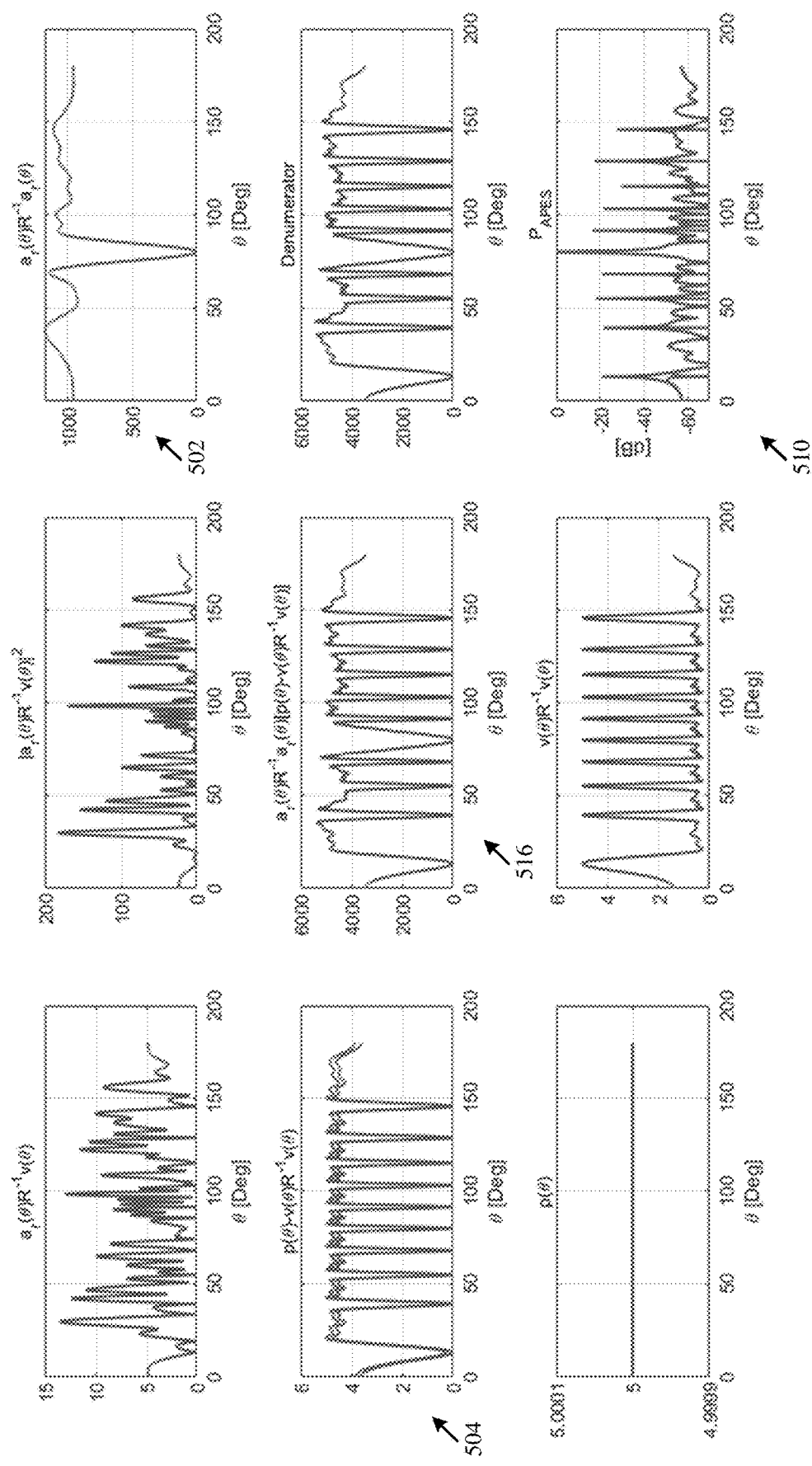
FIG. 5 is a schematic illustration of graphs depicting spectrums of components of the APES Equation for a second measurement simulation, to demonstrate a technical problem, which may be addressed in accordance with some demonstrative embodiments.

Reference is made to FIG. 5, which schematically illustrates graphs depicting spectrums of components of an APES Equation for a second measurement simulation, to demonstrate a technical problem, which may be addressed in accordance with some demonstrative embodiments. For example, the graphs of FIG. 5 may depict simulation results for components of the APES Equation according to Equation 8, for example, with respect to the second scenario of a non-uniform array with antenna distances $d_{TX}>\lambda/2$ and $d_{RX}=\lambda/2$.

In one example, the graphs of FIG. 5 depict the simulation results for components of the APES Equation, e.g., Equation 8, in a non-uniform array scenario having a single target, e.g., at an angle of about 80 degrees, using a MIMO antenna having 5 Tx antennas at a MIMO Tx radar antenna distance $d_{TX}>\lambda/2$, 10 Rx antennas at a MIMO Rx radar antenna distance $d_{RX}=\lambda/2$, and a virtual array spacing $d_{Virt}=\lambda/2$.

As shown in FIG. 5, a graph 502 represents simulated results of the first term $a_r^H(\theta)\hat{R}^{-1}a_r(\theta)$ of the denominator of Equation 8.

As shown in FIG. 5, the graph 502 reaches a single low value, e.g., a value of almost zero, at the angle of about 80 degrees, e.g., corresponding to the target.

As shown in FIG. 5, a graph 504 represents simulated results of the second term $p(\theta)-v(\theta)R^{-1}v(\theta)$ of the denominator of Equation 8.

As shown in FIG. 5, the graph 504 reaches a plurality of low values, e.g., values of almost zero, at a plurality of angles, which include the angle of about 80 degrees and a plurality of additional angles, which are different from the angle of 80 degrees. These results are in contrast to the single low peak of graph 404 (FIG. 4) for the uniform-array scenario.

As shown in FIG. 5, a graph 510 represents simulation results of the APES estimation, e.g., the value of $\hat{\beta}_{APES}(\theta)$ according to Equation 8.

As shown in FIG. 5, the graph 510 provides results similar to graph 504, e.g., a plurality of peaks greater than 40 dB at a respective plurality of angles. These results may contaminate the AoA spectrum estimated by the APES algorithm at the non-uniform antenna array scenario. For example, it may be difficult to identify the target at about 80 degrees, as it may be difficult to distinguish between the plurality of peaks in graph 504.

In some demonstrative embodiments, based on a comparison between the results of FIG. 4 and FIG. 5, there may be a need to provide a technical solution to allow reducing the number of peaks and/or eliminating some of the plurality of peaks, which are greater than 40 dB, and which correspond to angles different from the angle of the target, e.g., angles different from the angle of about 80 degrees, which corresponds to the target.

In some demonstrative embodiments, according to Equation 8, the first term $a_r(\theta)R^{-1}a_r(\theta)$ may be multiplied with the second term $p(\theta)-v(\theta)R^{-1}v(\theta)_n$ the denominator of Equation 8.

As shown in FIG. 5, a graph 516 represents simulation results of a product of a multiplication of the first term $a_r(\theta)R^{-1}a_r(\theta)$ with the second term $P(\theta)-v(\theta)R^{-1}v(\theta)$ As shown in FIG. 5, the plurality of low values of graph 504 may remain close to zero, e.g., at locations of Tx grating lobes of an LS response of the MIMO antenna array.

In one example, for an LS algorithm, a virtual array response may be a multiplication of the Tx and Rx responses of the antenna array, and, accordingly, Tx grating lobes may be cancelled by nulls of the Rx response of the array.

In some demonstrative embodiments, a constant factor, denoted $\gamma$, may be added to the second term $p(\theta)-v^H(\theta)\hat{R}^{-1}v(\theta)$ of the denominator of Equation 8.

In some demonstrative embodiments, the constant factor $\gamma$ may be defined based on a count of Tx antennas in the MIMO Array. In one example, the constant factor $\gamma$ may be defined $$\gamma = \frac{N}{20}$$

In other embodiments, the constant factor $\gamma$ may be defined based on any other additional or alternative parameter.

In some demonstrative embodiments, the constant factor $\gamma$ may be configured, for example, such that the product of the term $a_r(\theta)R^{-1}a_r(\theta)$ with the sum of $(\gamma+p(\theta)-v^H(\theta)\hat{R}^{-1}v(\theta)$ may result in a single low value, e.g., corresponding to the angle of the target, as described below.

In some demonstrative embodiments, the correction of Equation 8 utilizing the constant factor $\gamma$ may provide a solution, which is computationally efficient, and/or may be similar to a diagonal loading.

In some demonstrative embodiments, an APES formula may be configured to estimate the value of $\hat{\beta}_{APES}(\theta)$ based on Equation 8 and the constant factor $\gamma$, e.g., as follows:

$$\hat{\beta}_{APES_{New}}(\theta) = \frac{a_r^H(\theta)\hat{R}^{-1}v(\theta)}{|a_r^H(\theta)\hat{R}^{-1}v(\theta)|^2 + a_r^H(\theta)\hat{R}^{-1}a_r(\theta)} \quad (9)$$
$$\left(\gamma + p(\theta) - v^H(\theta)\hat{R}^{-1}v(\theta)\right)$$

In some demonstrative embodiments, for example, processor 132 (FIG. 1) may be configured to generate the radar information according to the AoA estimation based on the APES calculation of Equation 9.

In some demonstrative embodiments, the numerator of Equation 9 may include the term $a_r^M(\theta)a_r^M(\theta)$, which may be based on the Rx steering vector $a_r^H(\theta)$.

In some demonstrative embodiments, the denominator of Equation 9 may be based on the predefined constant factor $\gamma$, the Rx steering vector $a_r^H(\theta)$, and the parameter $p(\theta)$, which may be based on the Tx steering vector $a_t(\theta)$ of the MIMO antenna.

In some demonstrative embodiments, the denominator of Equation 9 may be based a sum of a first calculation element, e.g. $|a_r^H(\theta)\hat{R}^{-1}v(\theta)|^2$ and a second, calculation element, e.g., $|a_r^H(\theta)\hat{R}^{-1}a_r(\theta)(\gamma+p(\theta)-v^H(\theta)\hat{R}^{-1}v(\theta))$ In some demonstrative embodiments, the second calculation element $|a_r^H(\theta)\hat{R}^{-1}a_r(\theta)(\gamma+p(\theta)-v^H(\theta)\hat{R}^{-1}v(\theta))$ include a product of a third calculation element, e.g., the term and a fourth calculation element, e.g., the term $(\gamma+p(\theta)-v^H(\theta)\hat{R}^{-1}v(\theta))$ In some demonstrative embodiments, the first and third calculation elements may be based on the Rx steering vector.

In some demonstrative embodiments, the fourth calculation element may be based on the predefined constant factor $\gamma$, and the Tx steering vector $a_t(\theta)$.

In some demonstrative embodiments, for example, the fourth calculation element may include a sum of the predefined constant factor $\gamma$ and a fifth calculation element, e.g., $p(\theta)*v^H(\theta)\hat{R}^{-1}v(\theta)$, which is based on the Tx steering vector $a_t(\theta)$.

In some demonstrative embodiments, the APES calculation of Equation 9 may be implemented, for example, to provide an unbiased, or a substantially unbiased, estimation of a target Radar Cross Section (RCS), for example, which may provide an unbiased imaging of a scene, for example, even with low computational complexity.

In some demonstrative embodiments, the APES calculation of Equation 9 may be implemented, for example, in implementations not using a uniform antenna array. For example, the APES calculation of Equation 9 may be suitable for a non-uniform Tx antenna array and/or a non-uniform Rx antenna array, e.g., with an antennas spacing of $d_{TX}>\lambda/2$ and/or $d_{RX}>\lambda/2$.

Figure 6:
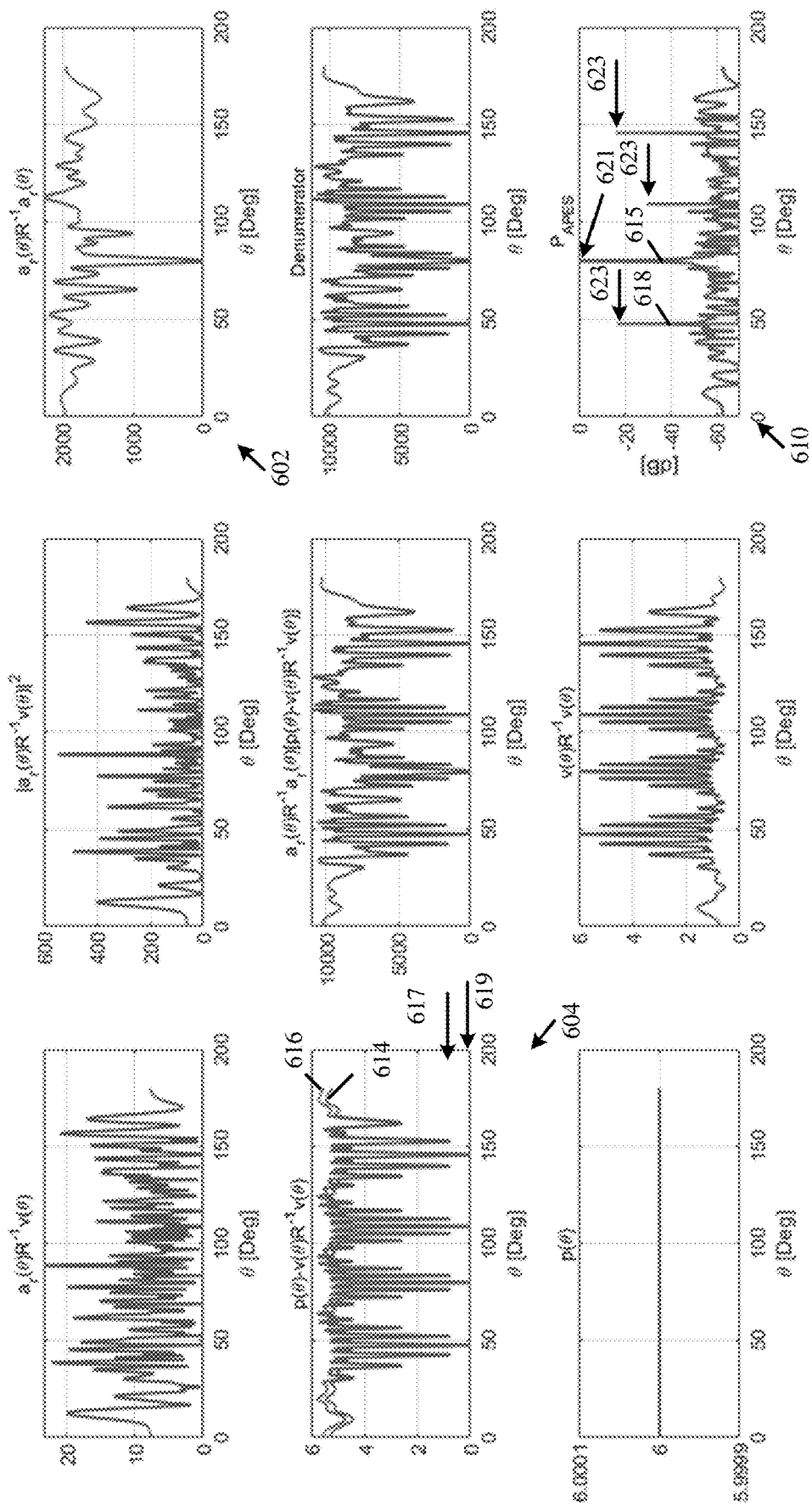
FIG. 6 is a schematic illustration of graphs depicting spectrums of components of an APES calculation, in accordance with some demonstrative embodiments.

Reference is made to FIG. 6, which schematically illustrates graphs depicting spectrums of components of an APES calculation, in accordance with some demonstrative embodiments. For example, the graphs of FIG. 6 may represent simulation results of components of Equation 9.

In one example, the graphs of FIG. 6 depict the simulation results for components of the modified APES Equation, e.g., Equation 9, in a non-uniform array scenario having a single target, e.g., at an angle of about 80 degrees, using a MIMO antenna having 6 Tx antennas at a MIMO Tx radar antenna distance $d_{TX}>\lambda/2$, 16 Rx antennas at a MIMO Rx radar antenna distance $d_{RX}=\lambda/2$, and a virtual array spacing $d_{Virt}=\lambda/2$.

In some demonstrative embodiments, as shown in FIG. 6, a graph 602 represents simulation results of the first term $a_r(\theta)R^{-1}a_r(\theta)$ in the denominator of Equation 9.

In some demonstrative embodiments, as shown in FIG. 6, the graph 602 reaches a single low value, e.g., a value of almost zero, at the angle of about 80 degrees, e.g., corresponding to the target.

In some demonstrative embodiments, as shown in FIG. 6, a curve 614 represents simulation results of the term $p(\theta) - v(\theta)R^{-1}v(\theta)$ of the denominator of Equation 9, e.g., without using the factor $\gamma$.

In some demonstrative embodiments, as shown in FIG. 6, a curve 616 represents simulation results of the term $(\gamma + p(\theta) - v^H(\theta)\hat{R}^{-1}v(\theta))$, the denominator of Equation 9, e.g., when corrected by the factor $\gamma$ In some demonstrative embodiments, as shown in FIG. 6, curve 616 may include a plurality of minimum points 617, e.g., which are substantially greater than zero, for example, corresponding to angles different from the angle of the target. This is in contrast to curve 614, which may include a plurality of minimum points 619, e.g., which are substantially close to zero, corresponding to angles different from the angle of the target In some demonstrative embodiments, as shown in FIG. 6, a curve 618 represents simulation results of the APES estimation, e.g., $\hat{\beta}_{APES}(\theta)$, according to Equation 8 e.g., without using the factor $\gamma$.

In some demonstrative embodiments, as shown in FIG. 6, a curve 615 depicts the APES calculation, e.g., $\hat{\beta}_{APES_{Mow}}(\theta)$, according to Equation 9, e.g., using the factor $\gamma$.

In some demonstrative embodiments, as shown in FIG. 6, the curve 615 provides a single peak 621 greater than 40 dB at the angle of about 80 degrees corresponding to the target. In contrast, curve 618 provides a plurality of peaks 623 greater than 40 dB.

Figure 7:
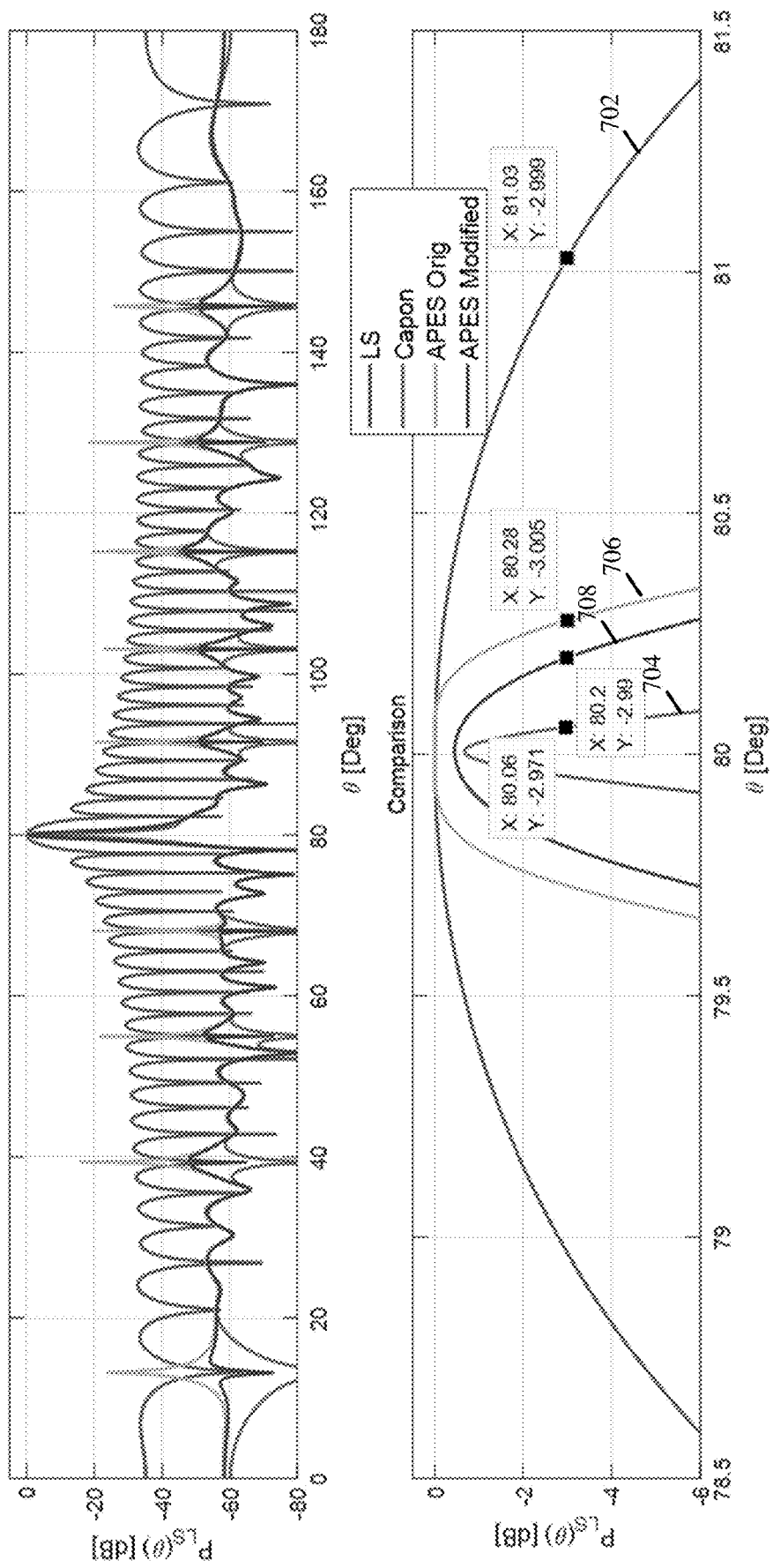
FIG. 7 is a schematic illustration of graphs depicting a comparison between AoA spectrum estimations, in accordance with some demonstrative embodiments.

Reference is made to FIG. 7, which schematically illustrate graphs depicting a comparison between AoA spectrum estimations, in accordance with some demonstrative embodiments.

In some demonstrative embodiments, as shown in FIG. 7, graph 700 depicts a curve 702 of AoA estimations, which may be based on an LS algorithm.

In some demonstrative embodiments, as shown in FIG. 7, graph 700 depicts a curve 704 of AoA estimations, which may be based on a Capon algorithm.

In some demonstrative embodiments, as shown in FIG. 7, graph 700 depicts a curve 706 of AoA estimations, which may be based on the APES algorithm according to Equation 8.

In some demonstrative embodiments, as shown in FIG. 7, graph 700 depicts a curve 708 of AoA estimations, which may be based on the APES algorithm according to Equation 9.

In some demonstrative embodiments, as shown in FIG. 7, curve 708 may provide an AoA estimation with a reduced bias, for example, compared to the increased bias of the Capon algorithm.

In some demonstrative embodiments, as shown in FIG. 7, curve 708 may provide a negligible bias, for example, less than 1 dB, e.g., a bias less than 0.4 dB.

Figure 8:
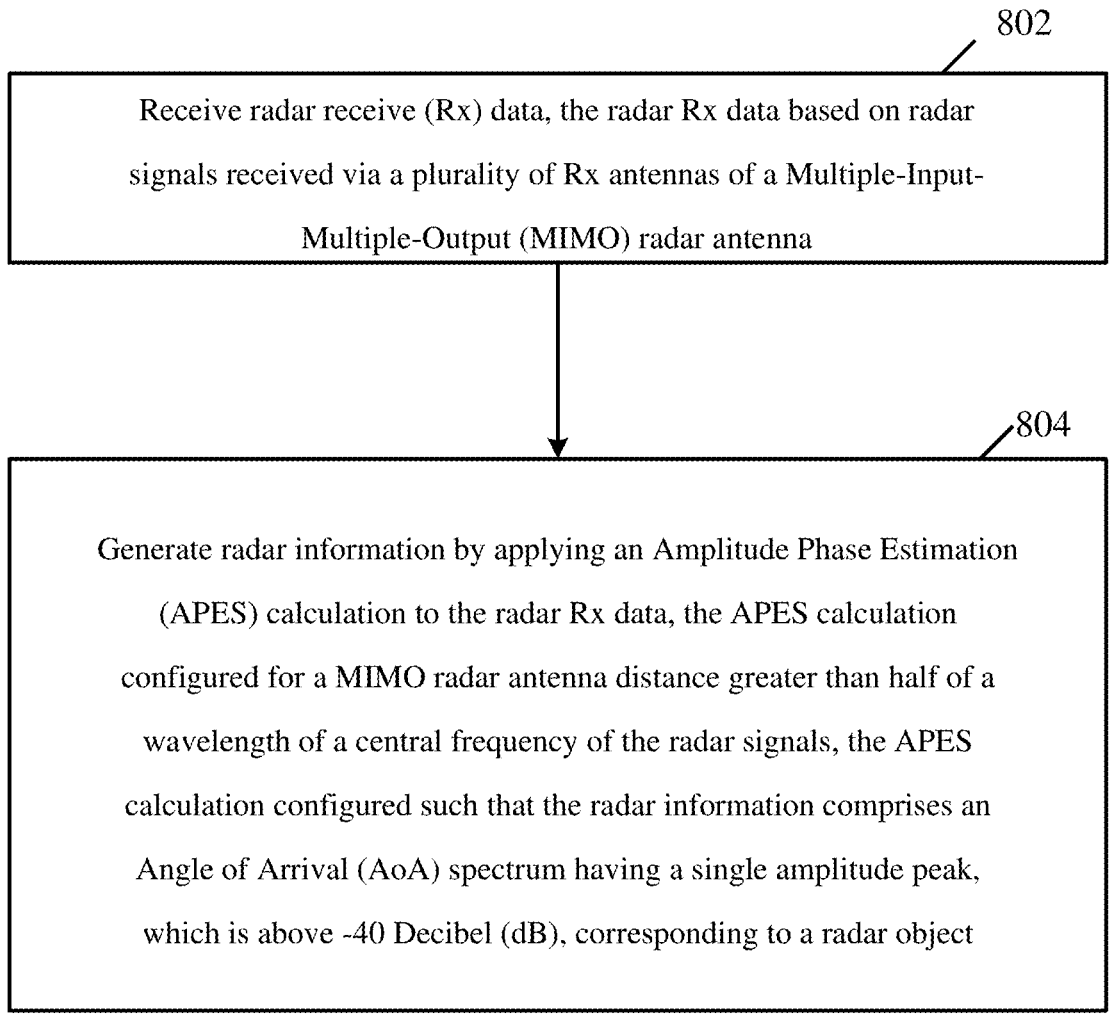
FIG. 8 is a schematic flow-chart illustration of a method of generating radar information based on an APES calculation, in accordance with some demonstrative embodiments.

Reference is made to FIG. 8, which schematically illustrates a method of generating radar information based on an APES calculation, in accordance with some demonstrative embodiments. For example, one or more of the operations of the method of FIG. 8 may be performed by one or more elements of a system, e.g., system 100 (FIG. 1), for example, one or more elements of a vehicle, e.g., vehicle 102 (FIG. 1), a radar, e.g., MIMO radar 104 (FIG. 1), a radar processor, e.g., radar processor 134 (FIG. 1), and/or a processor, e.g., processor 132 (FIG. 1).

As indicated at block 802, the method may include receiving radar Rx data based on radar signals received via a plurality of Rx antennas of a MIMO radar antenna. For example, processor 132 (FIG. 1) may receive, e.g., via input 109 (FIG. 1), the radar Rx data 111 (FIG. 1) based on radar signals received via the plurality of Rx antennas 116 of the MIMO radar antenna 181 (FIG. 1), e.g., as described above.

As indicated at block 804, the method may include generating radar information by applying an APES calculation to the radar Rx data, the APES calculation configured for a MIMO radar antenna distance greater than half of a wavelength of a central frequency of the radar signals, for example, wherein the APES calculation is configured such that the radar information includes an AoA spectrum having a single amplitude peak, which is above −40 dB, corresponding to a radar object. For example, radar processor 134 (FIG. 1) may generate radar information 113 (FIG. 1) by applying an APES calculation to the radar Rx data 111 (FIG. 1), for example, based on Equation 9, e.g., as described above.

Figure 9:
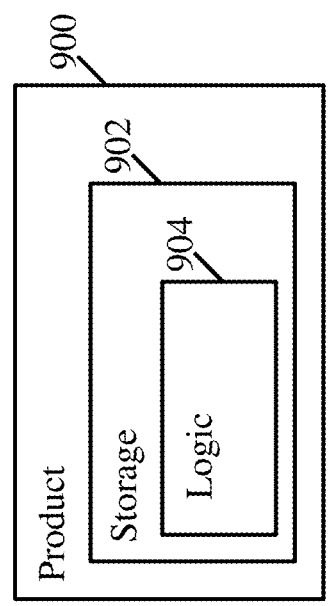
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at vehicle 102 (FIG. 1), radar 104 (FIG. 1), radar processor 134 (FIG. 1), and/or or processor 132 (FIG. 1). Additionally or alternatively, storage media 902, which may include computer-executable instructions, e.g., implemented by logic 904, operable to, when executed by at least one computer processor, enable the at least one computer processor to cause vehicle 102 (FIG. 1), radar 104 (FIG. 1), radar processor 134 (FIG. 1), and/or or processor 132 (FIG. 1) to perform, trigger and/or implement one or more operations and/or functionalities, e.g., as described herein. Additionally or alternatively, storage media 902, which may include computer-executable instructions, e.g., implemented by logic 904, operable to, when executed by at least one computer processor, enable the at least one computer processor to perform, trigger and/or implement one or more operations and/or functionalities described with reference to the FIGS. 1, 2, 3, 4, 5, 6, 7 and/or 8, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 900 and/or storage media 902 may include one or more types of computer-readable storage media capable of storing data, including volatile memory, non-volatile memory, removable or non-removable memory, erasable or non-erasable memory, writeable or re-writeable memory, and the like. For example, storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS)

memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a radar processor, the radar processor comprising an input to receive radar receive (Rx) data, the radar Rx data based on radar signals received via a plurality of Rx antennas of a Multiple-Input-Multiple-Output (MIMO) radar antenna; and a processor to generate radar information by applying an Amplitude Phase Estimation (APES) calculation to the radar Rx data, the APES calculation configured for a MIMO radar antenna distance greater than half of a wavelength of a central frequency of the radar signals, the APES calculation configured such that the radar information comprises an Angle of Arrival (AoA) spectrum having, for a radar object, a single amplitude peak, which is above −40 Decibel (dB), corresponding to the radar object.

Example 2 includes the subject matter of Example 1, and optionally, wherein the APES calculation comprises estimation of an amplitude value of the AoA spectrum based on a quotient of a first estimated value divided by a second estimated value, wherein the first estimated value is based on a first steering vector of the MIMO radar antenna, and wherein the second estimated value is based on a predefined constant factor, the first steering vector, and a second steering vector of the MIMO radar antenna.

Example 3 includes the subject matter of Example 2, and optionally, wherein the second estimated value is based on a sum of a first calculation element and a second calculation element, the second calculation element comprising a product of a third calculation element and a fourth calculation element, wherein the first and third calculation elements are based on the first steering vector, and wherein the fourth calculation element is based on the predefined constant factor and the second steering vector.

Example 4 includes the subject matter of Example 3, and optionally, wherein the fourth calculation element comprises a sum of the predefined constant factor and a fifth calculation element, which is based on the second steering vector.

Example 5 includes the subject matter of any one of Examples 2-4, and optionally, wherein the first steering vector comprises an Rx steering vector of the MIMO radar antenna, and the second steering vector comprises a transmit (Tx) steering vector of the MIMO radar antenna.

Example 6 includes the subject matter of any one of Examples 2-5, and optionally, wherein the predefined constant factor is based on a count of transmit (Tx) antennas in the MIMO radar antenna.

Example 7 includes the subject matter of any one of Examples 1-6, and optionally, wherein the single amplitude peak has an amplitude greater than −1 dB.

Example 8 includes the subject matter of any one of Examples 1-7, and optionally, wherein the radar processor is configured to generate the radar information comprising the AoA spectrum having an amplitude bias of no more than 1 dB.

Example 9 includes the subject matter of any one of Examples 1-8, and optionally, wherein the radar processor is configured to generate the radar information comprising the AoA spectrum corresponding to a plurality of radar objects, wherein for each radar object of the plurality of radar objects the AoA spectrum has a single amplitude peak, which is above −40 dB.

Example 10 includes the subject matter of any one of Examples 1-9, and optionally, wherein the MIMO radar antenna distance comprises at least one of a distance between first and second adjacent Rx antennas of the MIMO radar antenna, or a distance between first and second adjacent Transmit (Tx) antennas of the MIMO radar antenna.

Example 11 includes the subject matter of any one of Examples 1-10, and optionally, comprising the MIMO radar antenna, and a plurality of Rx chains to generate the radar Rx data based on the radar signals received via the plurality of Rx antennas.

Example 12 includes the subject matter of Example 11, and optionally, comprising a vehicle, the vehicle comprising a system controller to control one or more systems of the vehicle based on the radar information.

Example 13 comprises a radar device comprising the apparatus of any one of Examples 1-11.

Example 14 comprises a vehicle comprising the apparatus of any one of Examples 1-11.

Example 15 includes an apparatus comprising means for executing any of the described operations of Examples 1-12.

Example 16 includes a machine-readable medium that stores instructions for execution by a processor to perform any of the described operations of Examples 1-12.

Example 17 includes an apparatus comprising a memory; and processing circuitry configured to perform any of the described operations of Examples 1-12.

Example 18 includes a method including any of the described operations of Examples 1-12.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a radar processor, the radar processor comprising:
    a processor input configured to receive radar receive (Rx) data, the radar Rx data based on radar signals of a Multiple-Input-Multiple-Output (MIMO) radar antenna; and
    a processor configured to generate radar information by applying an Amplitude Phase Estimation (APES) calculation to the radar Rx data, the APES calculation configured for a MIMO radar antenna distance greater than half of a wavelength of a central frequency of the radar signals, the APES calculation configured such that the radar information comprises an Angle of Arrival (AoA) spectrum having, for a radar object, a single amplitude peak, which is above −40 Decibel (dB), corresponding to the radar object.

2. The apparatus of claim 1, wherein the APES calculation comprises estimation of an amplitude value of the AoA spectrum based on a quotient of a first estimated value divided by a second estimated value, wherein the first estimated value is based on a first steering vector of the MIMO radar antenna, and wherein the second estimated value is based on a predefined constant factor, the first steering vector, and a second steering vector of the MIMO radar antenna.

3. The apparatus of claim 2, wherein the second estimated value is based on a sum of a first calculation element and a second calculation element, the second calculation element comprising a product of a third calculation element and a fourth calculation element, wherein the first and third calculation elements are based on the first steering vector, and wherein the fourth calculation element is based on the predefined constant factor and the second steering vector.

4. The apparatus of claim 3, wherein the fourth calculation element comprises a sum of the predefined constant factor and a fifth calculation element, which is based on the second steering vector.

5. The apparatus of claim 2, wherein the first steering vector comprises an Rx steering vector of the MIMO radar antenna, and the second steering vector comprises a transmit (Tx) steering vector of the MIMO radar antenna.

6. The apparatus of claim 2, wherein the predefined constant factor is based on a count of transmit (Tx) antennas in the MIMO radar antenna.

7. The apparatus of claim 1, wherein the single amplitude peak has an amplitude greater than −1 dB.

8. The apparatus of claim 1, wherein the radar processor is configured to generate the radar information comprising the AoA spectrum having an amplitude bias of no more than 1 dB.

9. The apparatus of claim 1, wherein the radar processor is configured to generate the radar information comprising the AoA spectrum corresponding to a plurality of radar objects, wherein for each radar object of the plurality of radar objects the AoA spectrum has a single amplitude peak, which is above −40 dB.

10. The apparatus of claim 1, wherein the MIMO radar antenna distance comprises at least one of a distance between first and second adjacent Rx antennas of the MIMO radar antenna, or a distance between first and second adjacent Transmit (Tx) antennas of the MIMO radar antenna.

11. The apparatus of claim 1 comprising the MIMO radar antenna, and a plurality of Rx chains to generate the radar Rx data based on the radar signals of the MIMO antenna.

12. The apparatus of claim 11 comprising a vehicle, the vehicle comprising a system controller to control one or more systems of the vehicle based on the radar information.

13. A radar device comprising:
    a Multiple-Input-Multiple-Output (MIMO) radar antenna comprising a plurality of Transmit (Tx) antennas, and a plurality of Receive (Rx) antennas;
    a plurality of Rx chains to generate radar Rx data based on radar signals received via the plurality of Rx antennas; and
    a radar processor configured to generate radar information by applying an Amplitude Phase Estimation (APES) calculation to the radar Rx data, the APES calculation configured for a MIMO radar antenna distance greater than half of a wavelength of a central frequency of the radar signals, the APES calculation configured such that the radar information comprises an Angle of Arrival (AoA) spectrum having, for a radar object, a single amplitude peak, which is above −40 Decibel (dB), corresponding to the radar object.

14. The radar device of claim 13, wherein the APES calculation comprises estimation of an amplitude value of the AoA spectrum based on a quotient of a first estimated value divided by a second estimated value, wherein the first estimated value is based on a first steering vector of the MIMO radar antenna, and wherein the second estimated value is based on a predefined constant factor, the first steering vector, and a second steering vector of the MIMO radar antenna.

15. The radar device of claim 14, wherein the second estimated value is based on a sum of a first calculation element and a second calculation element, the second calculation element comprising a product of a third calculation element and a fourth calculation element, wherein the first and third calculation elements are based on the first steering vector, and wherein the fourth calculation element is based on the predefined constant factor and the second steering vector.

16. The radar device of claim 14, wherein the first steering vector comprises an Rx steering vector of the MIMO radar antenna, and the second steering vector comprises a Tx steering vector of the MIMO radar antenna.

17. The radar device of claim 13, wherein the single amplitude peak has an amplitude greater than −1 dB.

18. The radar device of claim 13, wherein the radar processor is configured to generate the radar information comprising the AoA spectrum corresponding to a plurality of radar objects, wherein for each radar object of the plurality of radar objects the AoA spectrum has a single amplitude peak, which is above −40 dB.

19. A vehicle comprising:
    a system controller configured to control one or more vehicular systems of the vehicle based on radar information; and
    a radar device configured to provide the radar information to the system controller, the radar device comprising:
        a Multiple-Input-Multiple-Output (MIMO) radar antenna comprising a plurality of Transmit (Tx) antennas, and a plurality of Receive (Rx) antennas;
        a plurality of Rx chains to generate radar Rx data based on radar signals received via the plurality of Rx antennas; and
        a radar processor configured to generate the radar information by applying an Amplitude Phase Estimation (APES) calculation to the radar Rx data, the APES calculation configured for a MIMO radar antenna distance greater than half of a wavelength of a central frequency of the radar signals, the APES calculation configured such that the radar information comprises an Angle of Arrival (AoA) spectrum having, for a radar object, a single amplitude peak, which is above −40 Decibel (dB), corresponding to the radar object.

20. The vehicle of claim 19, wherein the APES calculation comprises estimation of an amplitude value of the AoA spectrum based on a quotient of a first estimated value divided by a second estimated value, wherein the first estimated value is based on a first steering vector of the MIMO radar antenna, and wherein the second estimated value is based on a predefined constant factor, the first steering vector, and a second steering vector of the MIMO radar antenna.

21. The vehicle of claim 19, wherein the radar processor is configured to generate the radar information comprising the AoA spectrum corresponding to a plurality of radar objects, wherein for each radar object of the plurality of radar objects the AoA spectrum has a single amplitude peak, which is above −40 dB.

22. A product comprising one or more tangible computer-readable non-transitory storage media comprising computer-executable instructions operable to, when executed by at least one processor, enable the at least one processor to:
process radar receive (Rx) data, the radar Rx data based on radar signals of a Multiple-Input-Multiple-Output (MIMO) radar antenna; and
generate radar information by applying an Amplitude Phase Estimation (APES) calculation to the radar Rx data, the APES calculation configured for a MIMO radar antenna distance greater than half of a wavelength of a central frequency of the radar signals, the APES calculation configured such that the radar information comprises an Angle of Arrival (AoA) spectrum having, for a radar object, a single amplitude peak, which is above −40 Decibel (dB), corresponding to the radar object.

23. The product of claim 22, wherein the APES calculation comprises estimation of an amplitude value of the AoA spectrum based on a quotient of a first estimated value divided by a second estimated value, wherein the first estimated value is based on a first steering vector of the MIMO radar antenna, and wherein the second estimated value is based on a predefined constant factor, the first steering vector, and a second steering vector of the MIMO radar antenna.

24. The product of claim 23, wherein the second estimated value is based on a sum of a first calculation element and a second calculation element, the second calculation element comprising a product of a third calculation element and a fourth calculation element, wherein the first and third calculation elements are based on the first steering vector, and wherein the fourth calculation element is based on the predefined constant factor and the second steering vector.

25. The product of claim 22, wherein the instruction, when executed, cause the processor to generate the radar information comprising the AoA spectrum corresponding to a plurality of radar objects, wherein for each radar object of the plurality of radar objects the AoA spectrum has a single amplitude peak, which is above −40 dB.

* * * * *